Dec. 7, 1965  N. J. MELLIES  3,222,537
SYSTEM FOR PRODUCING RELATIVELY HIGH DIRECT CURRENT VOLTAGE
PULSES FROM LOW VOLTAGE D.C. SOURCE
Filed Feb. 28, 1961
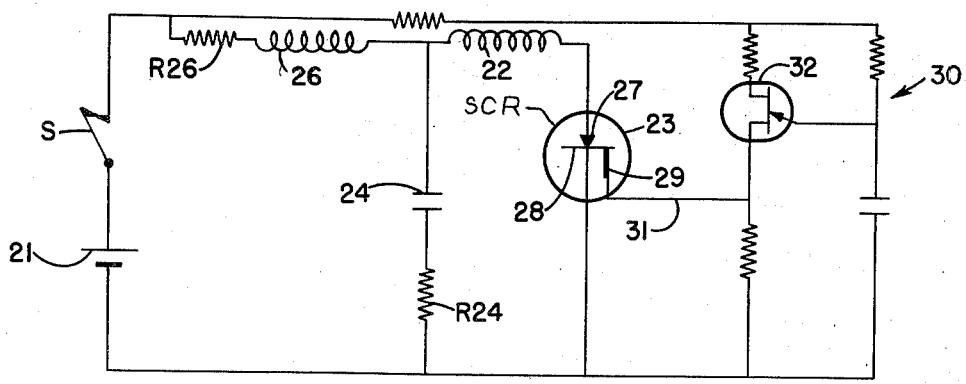
FIG. 2
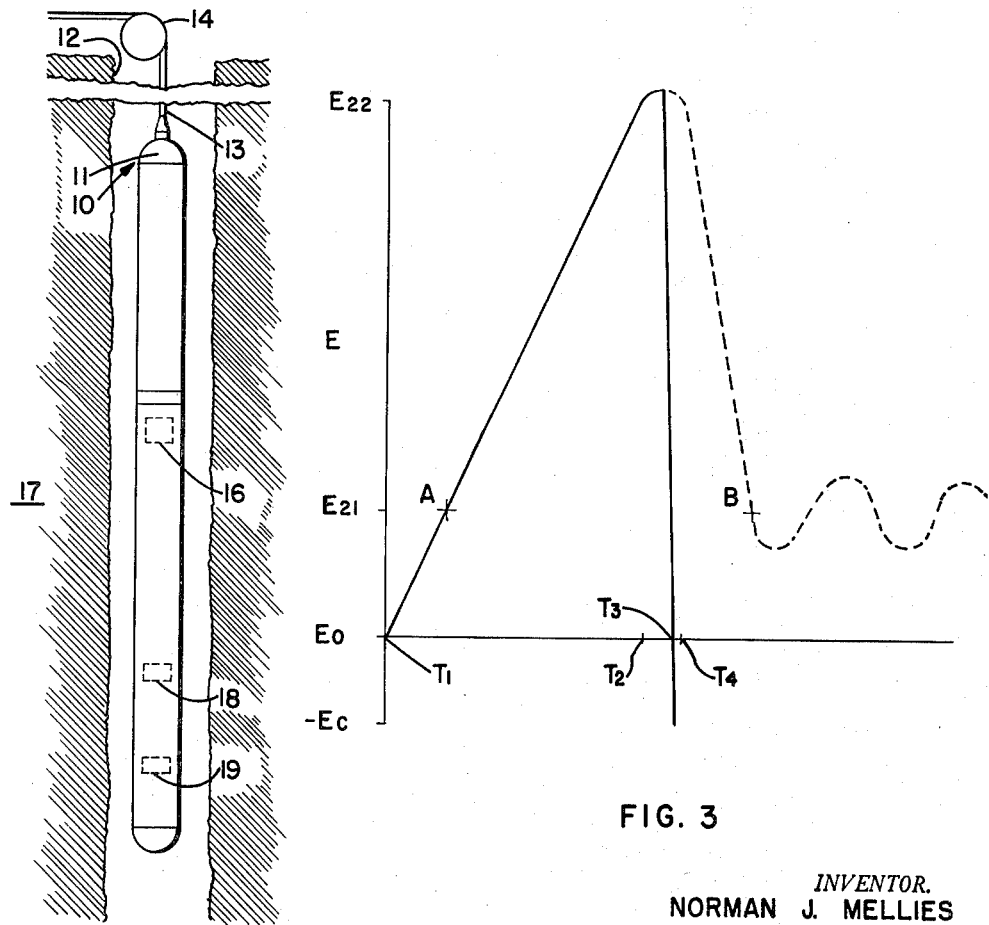
FIG. 1
FIG. 3
*INVENTOR.*
NORMAN J. MELLIES
BY Robert W. Mayer
HIS ATTORNEY

United States Patent Office 3,222,537
Patented Dec. 7, 1965

3,222,537
SYSTEM FOR PRODUCING RELATIVELY HIGH DIRECT CURRENT VOLTAGE PULSES FROM LOW VOLTAGE D.C. SOURCE
Norman J. Mellies, Houston, Tex., assignor to Dresser Industries, Inc., Dallas, Tex., a corporation of Delaware
Filed Feb. 28, 1961, Ser. No. 92,399
6 Claims. (Cl. 307—88.5)

This invention relates to a system for supplying amplified, direct current voltage pulses to means connected to a lower voltage direct current source and more particularly to compact and reliable circuit means for providing such pulses at locations remote from or inconvenient to high voltage power sources, wherein it is inconvenient or impossible to provide conventional amplifying means. The invention is particularly adapted to use in compact apparatus operated within earth wells and controlled from electrical power sources located at the surface of the earth, for example, well logging tools or the like.

Practically all well logging tools in commercial use are powered by means of electric current passed through one or more conductors contained in a cable which supports the tool within the well bore. If alternating current is sent through the cable, the elements of a direct current power supply must usually be incorporated into the logging tool in order to operate the downhole circuitry (some of which operates on direct current only) adding to the size and expense of the tool. If direct current is sent through the cable, it must be transmitted at relatively low voltage because the effectiveness of the insulating material in the cable is substantially impaired at the high temperatures and pressures existing within the well bore. Frequently such low voltage is below the level desirable for operating certain parts of the logging circuitry.

One instance of such requirement of high voltage current occurs in the operation of an acoustic or seismic velocity well logging tool. In such tool, sound waves formed by a transmitter passed through the material surrounding the well bore, are detected by one or more longitudinally spaced receivers and the travel time measured. One form of acoustic logging tool employs a magnetostrictive transducer as an element of the transmitter. Such transducers are preferably operated by the application of a series of short, high voltage, direct current pulses across an inductance. The provision, within a logging tool, of suitable circuit means for supplying such high voltage pulses of adequate sharpness has posed a substantial problem in the past in view of the foregoing limitations on the magnitude of the cable voltage, the space limitations inherent in the construction of the tool designed to fit within a narrow well bore and the high degree of reliability of circuit components required for successful operation under the extreme temperature and pressure condition encountered in well logging operations.

It is highly desirable, from a practical operational standpoint, that certain types of logging equipment be operable from a cable containing a single direct current conductor. For example, an acoustic or seismic velocity logging tool of the type used in determination of the effectiveness of cement bonding around casing would most advantageously be operated from a perforating truck since the information provided by such tool is particularly useful in determining at what depths a well should be perforated. Perforating trucks normally carry only a single conductor cable and a direct current voltage source since these simple means are effective to control subsurface operation of shaped charge or bullet perforators. Conventional acoustic-type logging tools cannot be operated from such trucks.

It is an object of this invention to provide relatively simple and highly reliable circuit means for producing amplified direct current voltage pulses of the type suitable for operating a transducer or the like.

It is a further object of the invention to provide a direct current voltage amplifier particularly adapted, because of its compactness and reliability, for use within a well logging tool.

It is another object of the invention to provide improved circuit means for use in conjunction with an acoustic-type logging tool to permit the successful operation of such tool by means of a single conductor cable and a direct current power source such as are used in the actuating of conventional well perforating equipment thus permitting this type of logging tool to be run from a perforating truck.

These and other objects of the invention are generally attained by the provision of a circuit means including a capacitor forming part of a first current path and connected to a discharge across a component to which a high voltage pulse is to be applied. This component is connected in series with a switch, the switch and the component forming a relatively low resistance second current path when the switch is closed. An inductance, connected in series between the capacitor and a direct current voltage source, is so chosen in value with relation to the value of the capacitance and the resistance of the first current path that the circuit is in oscillatory condition when the first current path is effectively connected to the source and produces a transient voltage overshoot across the capacitor. The switch is timed to turn on or become conductive at times coinciding with the presence of the overshoot voltage. It is thus possible to apply across a component in series with the switch a direct current voltage pulse of higher potential than that provided by the direct current source. The turning on of the switch in effect short-circuits the capacitor and effectively disconnects the first current path. Means are provided for turning off the switch after application of each voltage pulse to the component. This effectively connects the first current path to the source and disconnects the second current path. Oscillation begins and the cycle is repeated.

A preferred embodiment of the invention is illustrated in the accompanying drawings in which:

FIG. 1 is a diagrammatic view showing an acoustic logging tool of the type suited for use in connection with the invention;

FIG. 2 is a schematic circuit diagram of a preferred form of the invention; and

FIG. 3 is a plot of voltage against time as measured across a capacitor shown in FIG. 2.

FIG. 1 shows, in diagrammatic and highly simplified form, an acoustic-type logging tool generally indicated as at 10 which consists of an elongated, generally cylindrical housing 11 supported within a well bore 12 at the end of a cable 13. This cable contains one or more electrical conductors (not shown) and passes over a measuring wheel 14 at the top of the well 12. Suitable electronic means, which are not illustrated herein and which form no part of the present invention, are provided at the surface adjacent the top of well bore 12 in order to convert the intelligence received to information indicative of various properties of the earth formation traversed by the borehole, as is well known to the art.

The housing 11 of tool 10 contains transmitter 16 which is adapted to produce periodic acoustic shock waves which travel through any fluid (not shown in the drawings) contained in the well 12 and vertically through the traversed formation 17 thence back through the well fluid to be detected by the receivers 18 and 19 which are longitudinally spaced from the transmitter 16 and from each other by a predetermined distance. The transmission time of acoustic shock waves between transmitter 16 and receivers 18 and 19 provides valuable information regarding the nature of the material surrounding the instrument including earth formation 17.

A tool similar to tool 10 and employing the same transmitter 16 but a single receiver somewhat different from 18 and 19 is useful in determining the effectiveness of a cement bond between casing within a well bore and the surrounding earth formation. In such a tool, the receiver measures the amplitude of a selected acoustic shock wave transmitted through the steel casing.

This invention is not concerned with the details of acoustic or seismic velocity well logging as such which is a well known art disclosed in numerous patents, for example U.S. Patent 2,938,592 to Charske et al. Neither is this invention concerned with the details of acoustic cement bond logging per se.

FIG. 2 illustrates a circuit arrangement of this invention which is useful in actuating the acoustic transmitter 16. In the embodiment illustrated, a direct current voltage source, indicated by a battery 21, supplies power for actuating a magnetostrictive transducer represented by a coil 22 when a manually-operated switch S is in closed position, as shown. One side of the coil 22 is connected to a silicon controlled rectifier 23 which serves as a switch as will be more fully explained subsequently. The silicon controlled rectifier 23 and coil 22 are connected in series across a capacitor 24 which in turn is connected in series with an inductor 26. The silicon controlled rectifier 23 is of known design and includes anode 27, cathode 28, and gate 29, with the latter being coupled through conductor 31 to the output of a conventional transistor relaxation oscillator circuit 30 which provides triggering pulses of current to switch the silicon controlled rectifier 23 from its non-conductive to its conductive state. When in the former state, rectifier 23 presents a very high resistance; when in its latter state, it presents a very low resistance. The oscillator-trigger circuit 30 includes unijunction transistor 32 and is of the type disclosed on pages 51–53 of the General Electric Controlled Rectifier Manual, published by the General Electric Company in 1960.

Associated with each of the circuit components which make up a first current path is an inherent resistance indicated by resistor $R_{26}$ for inductor 26 and by $R_{24}$ for capacitor 24. In order to obtain a transient voltage overshoot across capacitor 24 it is necessary that the first current path be oscillatory in character when it is effectively connected to source 21. Thus the aggregate resistance Rc provided by the combination $R_{24}$ and $R_{26}$ must be equal to or less than $$2\sqrt{\frac{L}{C}}$$

where L is the total inductance of the circuit and C is the total capacitance. It is, therefore, desirable to employ components of such value as to minimize $R_{24}$, $R_{26}$ and consequently Rc.

The current path, made up of capacitor 24 and inductor 26 and their associated resistances, is said to be effectively connected to source 21 only when silicon controlled rectifier 23 is non-conductive. When the rectifier 23 is conductive, capacitor 24 is, in effect, short-circuited (as will be explained subsequently) and the first current path is said to be no longer effectively connected to source 21 although, obviously, the physical connections still exist.

Operation of the circuit illustrated in FIG. 2 may be best understood by reference to the voltage-time graph shown in FIG. 3 in which ordinates E represent the voltage drop across capacitor 24 at any time represented by abscissae T. Assume that at time $T_1$ silicon controlled rectifier 23 is in its "off" or non-conducting condition and that switch S has just been closed so that initially there is a zero potential drop ($E_0$) across capacitor 24. Current begins to flow through inductor 26, capacitor 24 begins to charge and the potential drop thereacross increases as shown. Owing to the high resistance presented by rectifier 23 in its non-conducting state, no current flows through the second current path composed of rectifier 23 and coil 22. When the potential across capacitor 24 approaches supply voltage, $E_{21}$, the current through inductor 26 decreases and causes a collapse of the magnetic field associated therewith. Such collapse induces a voltage across inductor 26 which is additive to the voltage existing across direct current source 21 and, in effect, assists this source in charging capacitor 24. For this reason, while the magnetic field associated with inductor 26 is collapsing, the voltage across capacitor 24 rises momentarily to a point substantially above the voltage $E_{21}$ supplied by the direct current source 21. Assume that the maximum potential appearing across capacitor 24 is represented by the point $E_{22}$ which is attained at time $T_2$. In accordance with the present invention, the silicon controlled rectifier 23 and relaxation oscillator 30 are so timed that a trigger pulse from transistor 32 across conductor 31 reaches gate 29 to switch silicon controlled rectifier 23 to its "on" or conducting condition at time $T_2$. When this happens, the first current path is no longer effectively connected to source 21, capacitor 24 is, in effect, short-circuited and the voltage appearing across it appears across magnetostrictive transducer coil 22. Capacitor 24 discharges completely between times $T_2$ and $T_3$ which amounts to less than one microsecond.

The result of the high voltage $E_{22}$ appearing across the transducer coil 22 results in the production of a relatively high power acoustic pulse from the transmitter 16 of FIG. 1. This, of course, contributes materially to the effective operation of the tool. The dotted portion of the curve in FIG. 3 represents the voltage across capacitor 24 as would exist if the silicon controlled rectifier 23 had not switched to the conductive state at time $T_2$ and illustrates the oscillatory character of the circuit about the voltage level $E_{21}$ which is the voltage of source 21.

An important feature of the invention is timing the silicon controlled rectifier 23 so that it becomes conductive at some time during the first half cycle of oscillation and in the interval when the voltage E is on approximately that portion of the curve between points A and B of FIG. 3. In this way, the additive voltage produced by the collapsed magnetic field associated with inductor 26 may be utilized. Preferably, of course, the silicon controlled rectifier 23 is timed to become conductive when the peak voltage $E_{22}$ is attained.

During the interval between $T_2$ and $T_3$ when capacitor 24 is discharging through coil 22 the current passing through the coil induces a magnetic field. When such discharge is completed, the current passing through coil 22 decreases causing the magnetic field associated therewith to collapse. This induces a voltage across coil 22 in a direction causing capacitor 24 to charge in the reverse direction, that is, against source 21, and causes a transient negative voltage to appear across the capacitor. Such condition is illustrated in FIG. 3 by the dropping of the voltage curve to the value $-E_c$ at time $T_4$. This applies a back voltage to silicon controlled rectifier 23 effective to switch it to its "off" or non-conductive state. The first current path is thereby effectively reconnected to source 21 and the cycle is repeated.

The combination of a silicon controlled rectifier used as a switch and a coil through which a high voltage pulse is applied provides a convenient and effective means of turning the switch off. It will be understood that in applications wherein the amplified voltage pulse is applied across a component other than an inductor, such as a piezoelectric transducer, different means for turning off the silicon controlled rectifier 23 must be provided. A number of such means are suggested in the aforementioned General Electric Controlled Rectifier Manual.

In connection with the formation of the acoustic shock waves, it is highly desirable that the high voltage pulses applied across coil 22 be extremely short and sharp which means that the rate of discharge of capacitor 24 be very rapid. The rate of discharge of such capacitor is, in turn, influenced by the speed with which a switch, such as silicon controlled rectifier 23, can be turned from the non-conductive to the conductive condition. Although silicon controlled rectifier 23 is the preferred form of switch because of the rapidity with which it can be switched from non-conductive to conductive states, it will be understood that any other type of quick acting switch having equivalent or substantially similar though slower, action such as a relay, may be employed in connection with this invention.

Similarly, where a silicon controlled rectifier is employed as the switching means, while it is preferred to trigger it from non-conductive to conductive state by means of triggering pulses supplied by the relaxation oscillator circuit 30, it will be understood that other equivalent means may be provided for supplying such triggering pulses. If a different type of switch is used, other appropriate triggering means may actuate it.

As a specific example of the invention, a circuit constructed according thereto has been found capable of supplying voltage pulses of 560 volts direct current using a voltage source 21 of 150 volts direct current. The values of the various critical components in the circuit producing this result were as follows:

| | |
|---|---|
| $R_{26}$ | 300 ohms. |
| $R_{24}$ | less than 1 ohm. |
| Voltage source 21 | 150 volts. |
| Capacitor 24 | 1 microfarad. |
| Inductor 26 | 28 henries. |
| Silicon controlled rectifier 23 | 2N1603. |
| Switching frequency | 55 cycles per second. |

While the invention has been described with reference to a specific and preferred embodiment thereof, it will be understood that various changes apparent to those skilled in the art may be made without departing from the spirit of the invention as defined by the following claims.

I claim:

1. A system for providing amplified direct current voltage pulses comprising:
    a direct current voltage source;
    circuit means, including inductive and capacitive components, said inductive and capacitive components of such values relative to the resistance of said circuit means such that twice the square root of the quotient of the inductance of said inductive component divided by the capacitance of said capacitive component is at least as great as said resistance so that an oscillating voltage transient appears across said capacitive component on effective connection of said circuit means in series with said voltage source; and
    means for alternately and at a predetermined frequency effectively connecting said circuit means in series with said voltage source and connecting a relatively low resistance current path across said capacitative component to coincide with the presence thereacross of a transient voltage overshoot.

2. A system according to claim 1 wherein said connecting means include semiconductor switching means.

3. A system according to claim 1 wherein said connecting means include a controlled rectifier.

4. A system according to claim 3 wherein said connecting means include means for periodically applying a back voltage to said rectifier to render it non-conductive.

5. A system for providing amplified direct current voltage pulses comprising:
    a direct current voltage source;
    a first current path including serially connected inductor means and capacitor means connected to said current source, the inductance and capacitance value of such means being such that twice the square root of the quotient of the inductance of said inductor means divided by the capacitance of said capacitor means is at least as great as the resistance of said first current path so that an oscillatory condition exists upon effective connection of said first current path to said source;
    a second current path connected across said capacitor means including serially connected inductor means and a controlled rectifier connected across said capacitor means; and
    means for periodically making said controlled rectifier conductive thereby effectively disconnecting said first current path from said source, such action coinciding with the presence of a transient voltage overshoot across said capacitor and thereby applying amplified voltage pulses to the inductor of said second current path.

6. A system according to claim 5 wherein said controlled rectifier is a silicon controlled rectifier and wherein the inductor of said second current path is effective to apply a reverse voltage to said silicon controlled rectifier subsequent to the application of said amplified voltage pulse thereby rendering said rectifier non-conductive and effectively connecting said first current path to said source.

References Cited by the Examiner

UNITED STATES PATENTS

| | | | |
|---|---|---|---|
| 2,361,274 | 10/1944 | Cravath | 340—18 |
| 2,931,455 | 4/1960 | Loofbourrow | 340—18 |
| 2,988,708 | 6/1961 | Schmidt | 331—111 |
| 3,019,355 | 1/1962 | Morgan | 331—111 |
| 3,113,241 | 12/1963 | Yonushka | 307—88.5 |
| 3,119,058 | 1/1964 | Genuit | 307—88.5 |

ARTHUR GAUSS, *Primary Examiner.*

IRVING L. SRAGOW, CHESTER L. JUSTUS,
*Examiners.*